(12) United States Patent
Beaty et al.

(10) Patent No.: US 9,852,597 B2
(45) Date of Patent: Dec. 26, 2017

(54) PROXIMITY BASED AD-HOC MESSAGING, ALERTING, AND TRACKING SYSTEM

(71) Applicant: RedCritter Corp., Flower Mound, TX (US)

(72) Inventors: Robert M Beaty, Flower Mound, TX (US); David R Jenness, Flower Mound, TX (US); Randy M Whelan, Coppell, TX (US)

(73) Assignee: RedCritter Corp., Flower Mound, TX (US)

( * ) Notice: Subject to any disclaimer, the term of this patent is extended or adjusted under 35 U.S.C. 154(b) by 0 days.

(21) Appl. No.: 15/269,474

(22) Filed: Sep. 19, 2016

(65) Prior Publication Data

US 2017/0084151 A1   Mar. 23, 2017

Related U.S. Application Data

(60) Provisional application No. 62/222,293, filed on Sep. 23, 2015.

(51) Int. Cl.
| | | |
|---|---|---|
| G08B 1/08 | (2006.01) | |
| G08B 21/02 | (2006.01) | |
| H04W 4/00 | (2009.01) | |

(52) U.S. Cl.
CPC ..... *G08B 21/0272* (2013.01); *G08B 21/0263* (2013.01); *G08B 21/0277* (2013.01); *G08B 21/0294* (2013.01); *H04W 4/008* (2013.01)

(58) Field of Classification Search
CPC ............ G08B 21/0272; G08B 21/0263; G08B 21/0277; G08B 21/0294; H04W 4/008
See application file for complete search history.

(56) References Cited

U.S. PATENT DOCUMENTS

| | | | |
|---|---|---|---|
| 7,696,887 B1 * | 4/2010 | Echavarria | G08B 21/0227 340/573.1 |
| 8,624,722 B2 * | 1/2014 | Miller | G01S 5/0215 340/539.1 |
| 8,810,392 B1 * | 8/2014 | Teller | G08B 21/24 235/385 |
| 9,299,071 B1 * | 3/2016 | Klingen | G06Q 20/027 |
| 9,560,426 B1 * | 1/2017 | Daniel | H04L 67/125 |
| 2003/0008659 A1 * | 1/2003 | Waters | H04W 4/04 455/456.1 |
| 2003/0063003 A1 * | 4/2003 | Bero | G08B 21/0227 340/573.1 |
| 2005/0128074 A1 * | 6/2005 | Culpepper | G08B 21/0269 340/539.1 |

(Continued)

*Primary Examiner* — Joseph Feild
*Assistant Examiner* — Rufus Point
(74) *Attorney, Agent, or Firm* — Brian Tucker; Kirton McConkie

(57) ABSTRACT

A proximity based ad-hoc messaging, alerting, and tracking system can be employed to quickly and efficiently propagate alerts when a child or other individual becomes lost. Various types of alerts can be provided to facilitate locating a lost individual even in scenarios where a network connection or GPS is not available. The system can also be employed to track the presence of an individual after traveling in a vehicle to enable detecting when the individual has been separated from all guardians such as would be the case when the individual is left in the vehicle.

16 Claims, 18 Drawing Sheets

(56) References Cited

U.S. PATENT DOCUMENTS

| | | | | |
|---|---|---|---|---|
| 2005/0134459 A1* | 6/2005 | Glick | ............... | G08B 13/1427 340/572.1 |
| 2006/0199534 A1* | 9/2006 | Smith | ............... | G08B 21/023 455/41.2 |
| 2006/0255935 A1* | 11/2006 | Scalisi | ............... | B60R 25/00 340/539.13 |
| 2007/0229350 A1* | 10/2007 | Scalisi | ............... | G06F 21/35 342/350 |
| 2010/0141393 A1* | 6/2010 | Daniel | ............... | A43B 3/00 340/10.3 |
| 2010/0309002 A1* | 12/2010 | Duvall | ............... | G08B 21/0247 340/573.4 |
| 2014/0247152 A1* | 9/2014 | Proud | ............... | H02J 7/025 340/870.07 |
| 2014/0274115 A1* | 9/2014 | Michalson | ............... | H04W 4/028 455/456.1 |
| 2014/0300483 A1* | 10/2014 | Guo | ............... | G08B 21/0258 340/686.6 |
| 2015/0247913 A1* | 9/2015 | Messier | ............... | G01S 5/0027 340/539.13 |
| 2016/0063836 A1* | 3/2016 | Fishwick | ............... | G08B 21/0272 340/8.1 |
| 2016/0092880 A1* | 3/2016 | Klingen | ............... | G06Q 20/42 705/16 |
| 2016/0117904 A1* | 4/2016 | Song | ............... | G08B 21/0269 340/539.13 |
| 2016/0335876 A1* | 11/2016 | Verma | ............... | G01S 11/06 |
| 2017/0042125 A1* | 2/2017 | Kim | ............... | A01K 11/00 |
| 2017/0201858 A1* | 7/2017 | Li | ............... | H04W 4/021 |
| 2017/0255820 A1* | 9/2017 | Liu | ............... | G06K 9/00288 |

* cited by examiner

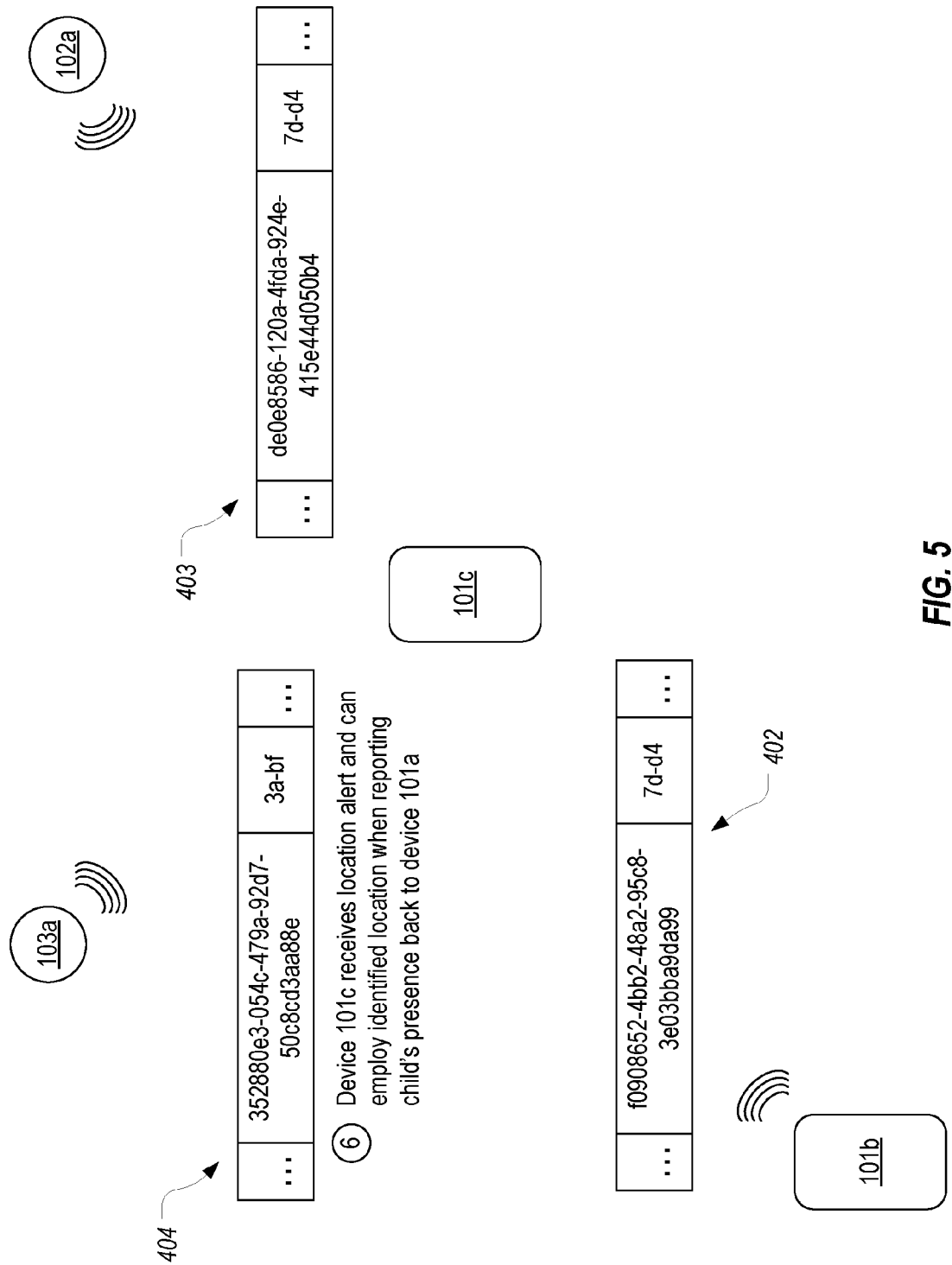

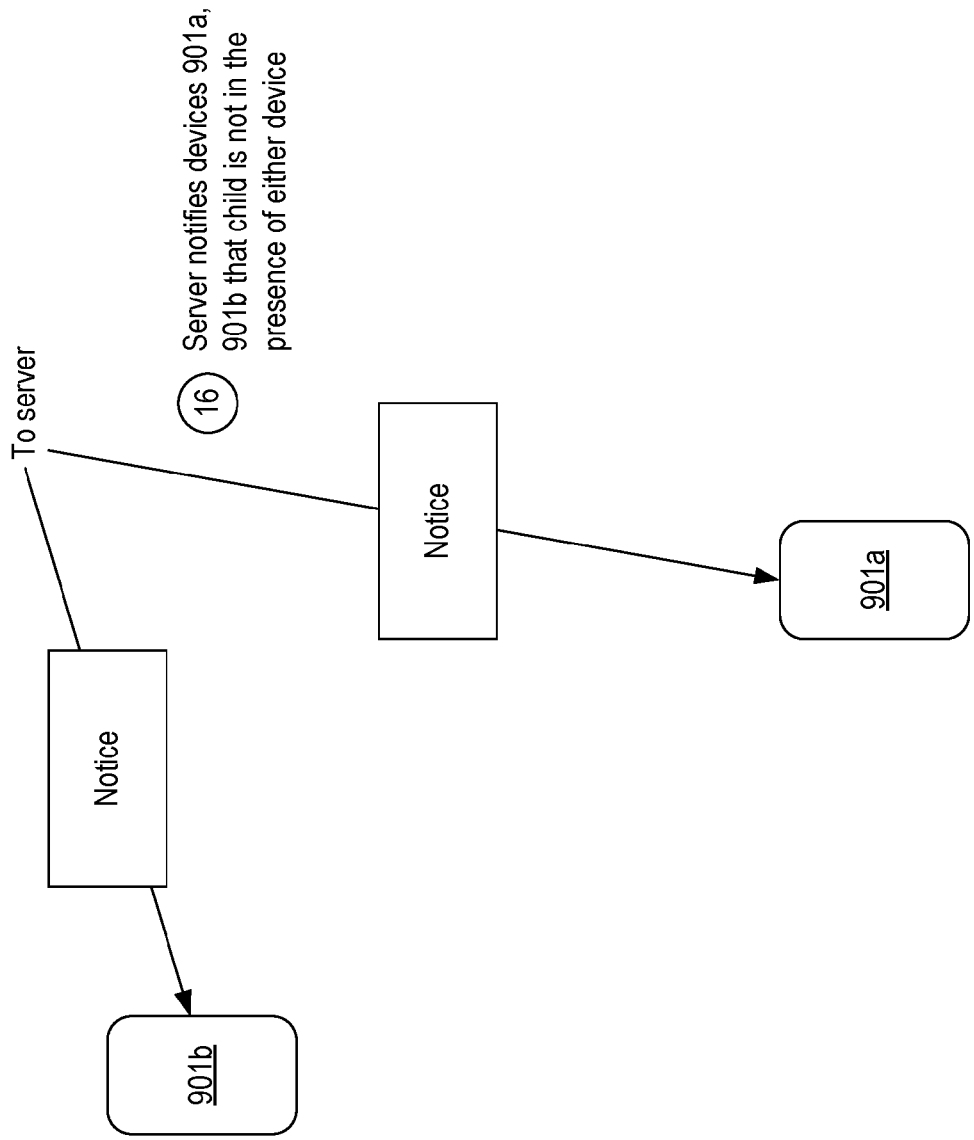
FIG. 9E

PROXIMITY BASED AD-HOC MESSAGING, ALERTING, AND TRACKING SYSTEM

CROSS-REFERENCE TO RELATED APPLICATIONS

This application claims the benefit of U.S. Provisional Application No. 62/222,293, which was filed on Sep. 23, 2015, and incorporates the contents of that application by reference.

BACKGROUND

The need to locate lost individuals, pets, or items has long been a problem. Additionally, people often leave their pet or child in the car resulting in disastrous consequences that could have been easily avoided. In the case of missing children, research has shown that the most critical aspect of successfully locating a child is the speed at which he or she can be found. Presently, systems such as the Amber Alert system require a relatively large amount of time upfront. For example, the parent must realize the child is lost, contact law enforcement, and explain the incident, after which law enforcement must confirm the abduction and then proceed to send alerts to the population. Due to the amount of time that elapses before the alerts are sent, Amber alerts often cover a large geographical area to account for the distance that the perpetrator may have traveled in the interim.

Some tracking systems have been created to address the inherent delays in the Amber alert system. With these tracking systems, the child or other individual must carry a tracking device that is capable of communicating over a network (e.g., a Wi-Fi or cellular network) to report its location. Oftentimes, location is reported using GPS coordinates. which may not always be available (e.g., when the child is indoors) rendering such systems unreliable. Also, if the child is separated from the tracking device or the tracking device loses power, the system will fail.

BRIEF SUMMARY

The present invention extends to a proximity based ad-hoc messaging, alerting, and tracking system. This system can be employed to quickly and efficiently propagate alerts when a child or other individual becomes lost using a short range wireless protocol. Various types of alerts can be provided to facilitate locating a lost individual even in scenarios where a network connection or GPS is not available. The system can also be employed to track the presence of an individual after traveling in a vehicle to enable detecting when the individual has been separated from all guardians such as would be the case when the individual is left in the vehicle.

In one embodiment, the present invention is performed by a user device as a method for implementing an alerting system. The user device can monitor for alerts that are transmitted using a short range wireless protocol. The user device can then receive a first alert that includes an alert identifier that indicates that an individual is lost and an identifier of the lost individual. In response, the use device can generate and send a second alert that includes an alert identifier that indicates that an individual is lost and the identifier of the lost individual. The user device can also use the identifier of the lost individual to obtain and display information about the lost individual.

In another embodiment, the present invention is implemented as computer storage media storing computer-executable instructions which when executed on a user device implement a method comprising: monitoring for alerts that are transmitted using a short range wireless protocol; receiving a child lost alert that includes an identifier of a lost child; and generating and periodically sending a child lost forwarded alert that includes the identifier of the lost child.

In another embodiment, the present invention is implemented as a method for tracking an individual. A user device can determine that the user device is traveling in a vehicle, and can monitor for presence alerts from other devices within proximity of the user device. Each presence alert can include an identifier of either a guardian or an individual for which the guardian is responsible. In response to receiving presence alerts, the user device can compile a list that includes the identifiers contained in the presence alerts. The list can include an identifier of a child device and an identifier of another user device. The user device can detect that the user device is no longer traveling in the vehicle and, in response, send the compiled list to a server. The user device can then continue to monitor for presence alerts from the child device. Upon ceasing to receive presence alerts from the child device, the user device can notify the server that the user device is no longer receiving presence alerts from the child device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 5 provides another example of how alerts can be broadcast;

FIGS. 9A-9E illustrate the process by which one or more guardians can be notified when a child is detected as no longer being in the presence of at least one of the guardians.

DETAILED DESCRIPTION

The present invention is generally directed to a messaging, alerting, and tracking system. As an overview, this system can be employed to propagate alerts when someone or something is lost. This specification will primarily describe embodiments in which the system is employed when a child is lost. However, the same techniques can equally be employed when any individual or any item has become lost or otherwise separated from a parent or other guardian. In the claims, the term individual should be construed to encompass any type of individual including a child, an elderly person, or a mentally impaired person.

Figure 1:
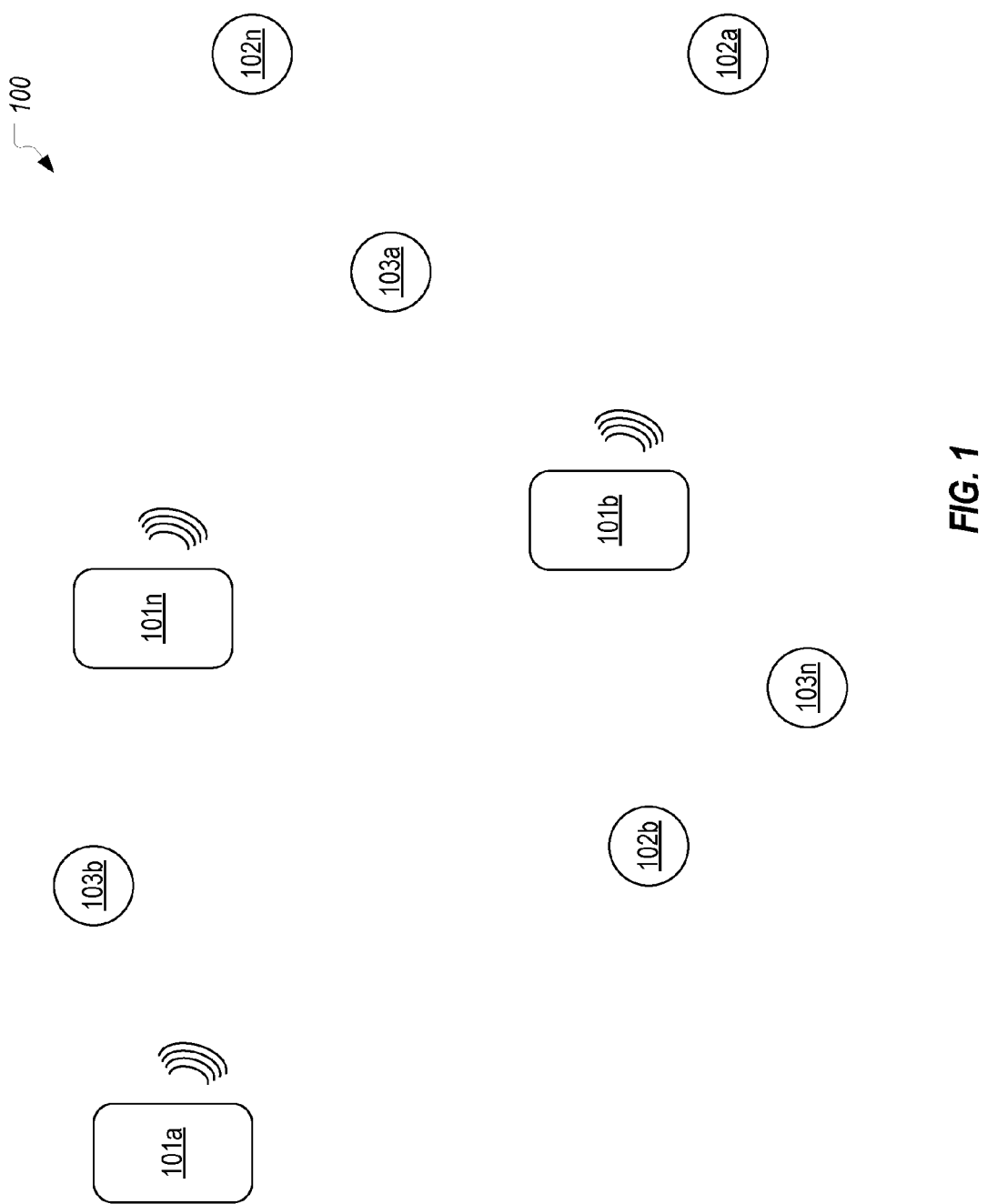
FIG. 1 illustrates an example computing environment in which the present invention can be implemented.

FIG. 1 illustrates a computing environment 100 in which the proximity based ad-hoc messaging, alerting, and tracking system of the present invention can be implemented. Computing environment 100 is shown as including a number of user devices 101a-101n, child devices 102a-102n, and location devices 103a-103n (where n represents any integer and will typically be very large) In typical embodiments, user devices 101a-101n are computing devices (which are preferably mobile devices such as smart phones) capable of both receiving and transmitting packets using a suitable short range wireless protocol (e.g., any device capable of transmitting and receiving Bluetooth Low Energy (BLE) packets). Child devices 102a-102n can be any device capable of transmitting packets whether or not it is also capable of receiving packets. For example, a child device may be a smart phone or a beacon configured to send out BLE packets containing advertising channel PDUs. Location devices 103a-103n are typically simple devices configured only to transmit packets (e.g., beacons), but could be any device capable of transmitting packets.

In this specification, a beacon should be construed as a simple device that is configured to only transmit advertisement packets. In typical embodiments, a beacon can be configured to transmit such advertisement packets as iBeacon packets encapsulated as the PDU of a BLE packet. A benefit of employing beacons for child devices 102a-102n and location devices 103a-103n is that they require very little power and can therefore operate for a long period of time without replacing the batteries.

Each of user devices 101a-101n can include an application (e.g., a mobile app) or an operating system feature that is configured to be invoked when an advertisement is received. For example, a mobile application could be registered with a Bluetooth component of the device's operating system to receive BLE packets such that the operating system passes received BLE packets to the mobile application for processing. The application/feature can also be configured to broadcast packets in various situations as will be described below. In contrast, child devices and location devices can be configured to continuously broadcast packets as will also be further described below.

Figure 2:
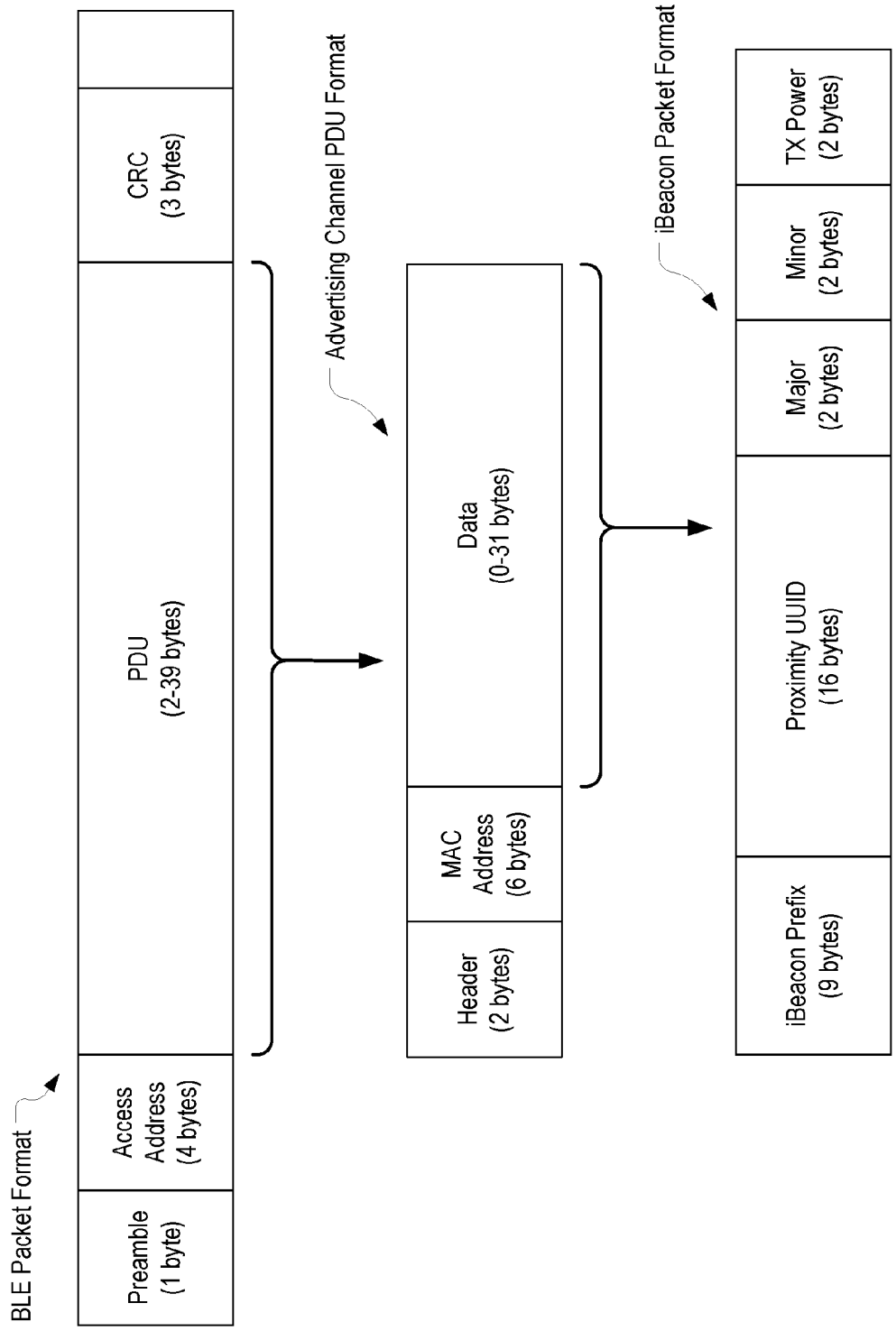
FIG. 2 illustrates various known packet formats.

FIG. 2 illustrates a current format of a BLE packet that can be used to transmit advertisements. As this format is known by those of skill in the art, it will not be described in detail. Of importance to embodiments of the present invention is how the iBeacon packet format can be employed within the data portion of a BLE advertising channel PDU. As shown, the data portion of the advertising channel PDU format can be 31 bytes. An iBeacon packet divides these 31 bytes into a 9 byte header, a 16 byte proximity UUID, a 2 byte major field, a 2 byte minor field, and a 2 byte TX power field.

Figure 3:
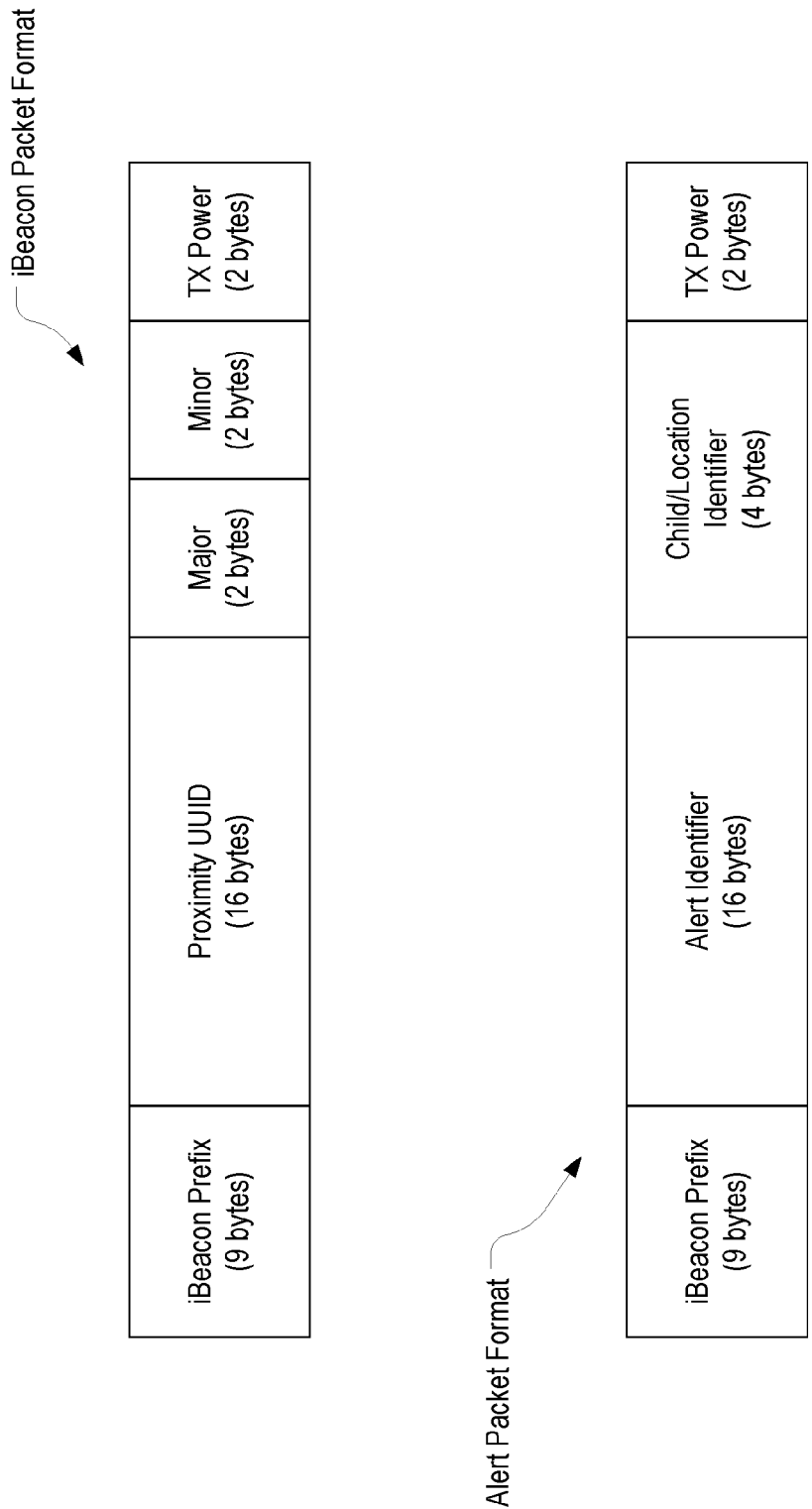
FIG. 3 illustrates how the present invention can employ a common beacon packet format to transmit alerts.

Turning now to FIG. 3, an example of how this iBeacon packet format can be employed to identify a particular type of alert as well as to identify an individual, pet, item, etc. that is the subject of the alert. In this specification, the term alert will be used generally to describe any type of advertisement packet that is broadcast by any type of device (e.g., by a user device, a child device, or a location device). As shown, the present invention defines an alert packet format in which the proximity UUID field of an iBeacon packet is used to define an alert identifier while the combination of the major and minor fields of the iBeacon packet is used to define an identifier of the subject of the alert.

Figure 3A:
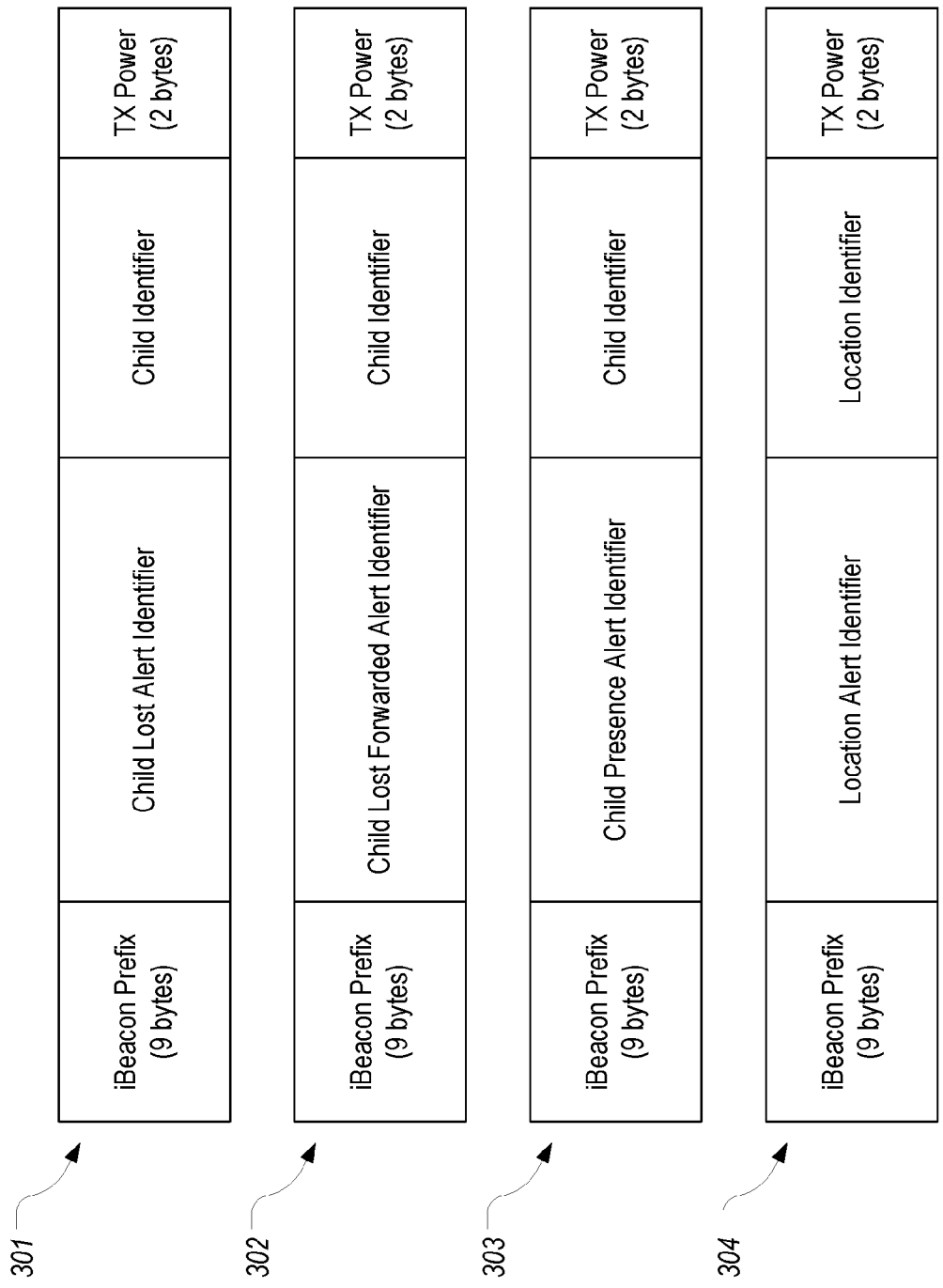
FIG. 3A illustrates various example alert packets that can be employed in embodiments of the present invention.

FIG. 3A provides examples of various types of alerts that can be employed including a child lost alert type 301, a child lost forwarded alert type 302, a child presence alert type 303, and a location alert type 304. As mentioned above, each type of alert can be identified using a specific alert identifier. In embodiments that employ the iBeacon packet format, this alert identifier can be a 16 byte number. For example, the child lost alert identifier can be defined as "a50bb6e-0025-4d18-bab8-0308db25662d" such that any child lost alert would include this 16 byte identifier within the proximity UUID field. Similarly, the child lost forwarded alert identifier can be defined as "f0908652-4bb2-48a2-95c8-3e03bba9da99" such that any child lost forwarded alert would include this 16 byte identifier within the proximity UUID field.

The terms "child lost," "child lost forwarded," and "child presence" are used only to describe a typical context in which these alerts are used. However, these alerts can also be used in the context of other individuals or items. For example, when an elderly individual is lost, a child lost alert containing an identifier of the lost elderly individual can be broadcast. Similarly, an elderly individual or item may carry/include a child device that broadcasts a child presence alert. In short, the present invention can be implemented in the same manner regardless of the individual or item that has become lost.

A unique 4 byte identifier of the subject of the alert can be stored across the major and minor fields thus enabling billions of different subjects (e.g., children, elderly, pets, locations, etc.) to exist within the system. With some alerts, this identifier will represent an individual or item to be monitored or tracked (hereinafter a "child identifier"), while with other alerts, this identifier will represent a location (hereinafter a "location identifier"). As will be described in detail below, the inclusion of this identifier can allow a receiving device to query a server for context of the alert as well as to make various determinations regarding how to respond to a received alert. Although iBeacon and BLE may be employed in preferred embodiments (due to their currently ubiquitous nature), the present invention may equally be employed with other suitable short range communication protocols and packet formats.

As mentioned above, child devices 102a-102n and location devices 103a-103n can typically be in the form of beacons which continuously advertise their presence. In other words, each of these devices can periodically broadcast a BLE packet containing the appropriate alert. In the case of a child device, a child presence alert (e.g., an iBeacon packet containing the child presence alert identifier as the proximity UUID) that includes the child's unique identifier (e.g., within the major and minor fields of the iBeacon packet) will be broadcast. In contrast, in the case of a location device, a location alert (e.g., an iBeacon packet containing the location alert identifier as the proximity UUID) that includes the location's unique identifier will be broadcast. Because the child and location devices continuously broadcast these alerts, any user device that comes within proximity of the child or location devices will receive the broadcast alert and will become aware of the presence of the child or the location.

On the other hand, user devices 101a-101n can be configured to broadcast child lost and child lost forwarded alerts. A user device can broadcast a child lost alert when that user device is the initiator of the child lost alert. For example, if a parent determines that his or her child has become lost, the parent can employ his or her user device (e.g., by interacting with a mobile application) to broadcast a child lost alert that includes the identifier of the lost child. To facilitate this process, the parent (or guardian) can have an account that associates the parent with one or more children. By virtue of being logged in to the account, the mobile application may provide the option for the parent to report that one of the associated children is lost (e.g., by selecting a representation of the lost child and providing input identifying that the child is lost).

Regardless of how the parent indicates that a child is lost, the user device can commence broadcasting a child lost alert that includes the lost child's identifier. As a result, any other user device within proximity will receive the child lost alert. In response to receiving a child lost alert, the receiving device can commence broadcasting a child lost forwarded alert that includes the same child identifier that was included in the child lost alert. Any other device that receives a child lost forwarded alert can then rebroadcast the child lost forwarded alert. In this way, the alert can be propagated in a peer-to-peer fashion regardless of whether any of the devices have a network connection. In other words, the present invention can be employed to propagate an alert without requiring that the devices be connected to the internet via Wi-Fi or a cellular connection.

One reason for employing the child lost forwarded alert rather than simply rebroadcasting the child lost alert is to enable receiving devices to determine whether they are within proximity of the initiator. In other words, if the receiving device receives the child lost alert, it can know that the initiator of the child lost alert is nearby. In such cases, if the user of the receiving device happens to locate the lost child, he or she will know that the parent/guardian is in the immediate vicinity and can take appropriate action.

Figure 4A:
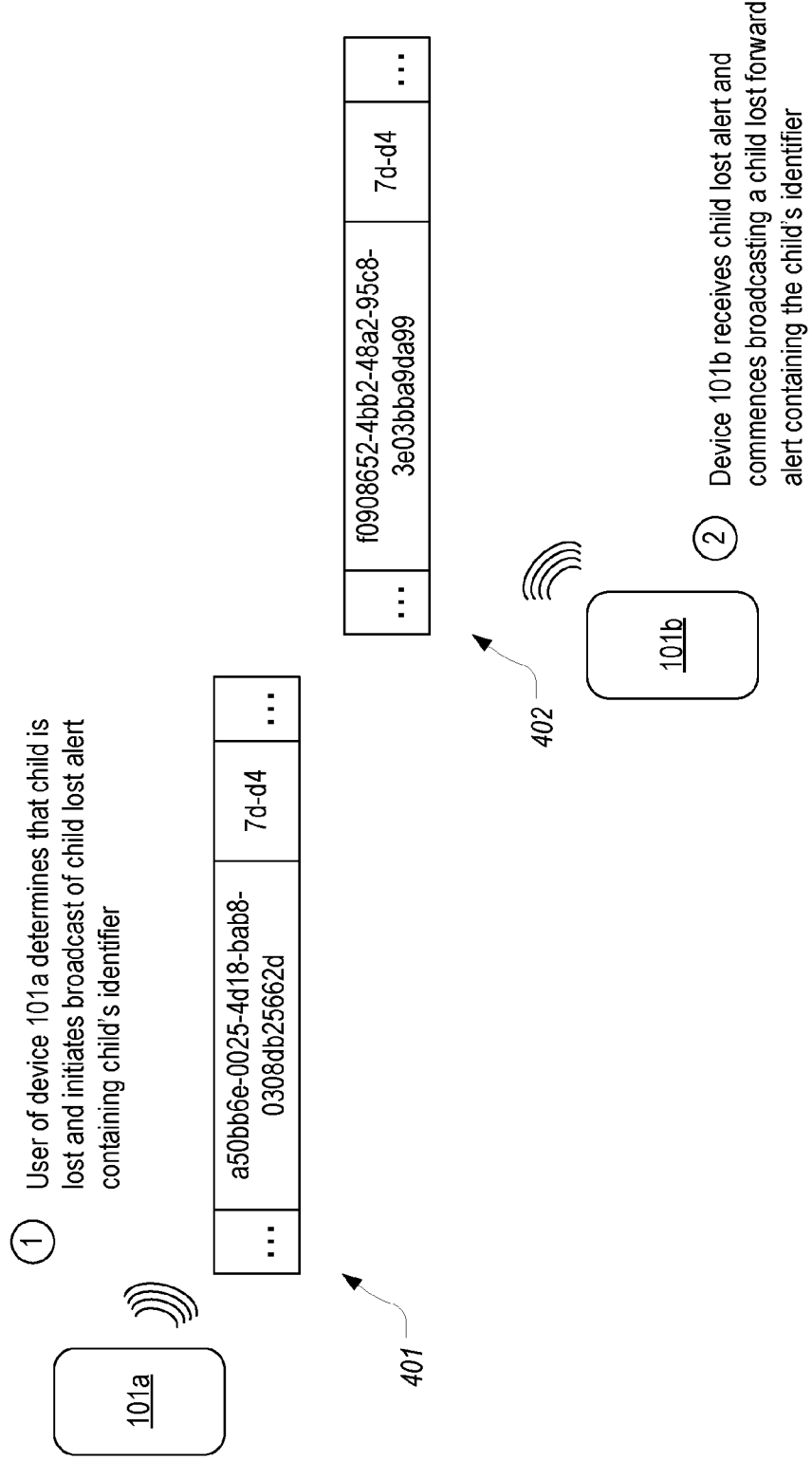
FIGS. 4A and 4B provide an example of how alerts can be broadcast and propagated in a peer-to-peer fashion.
Figure 4B:
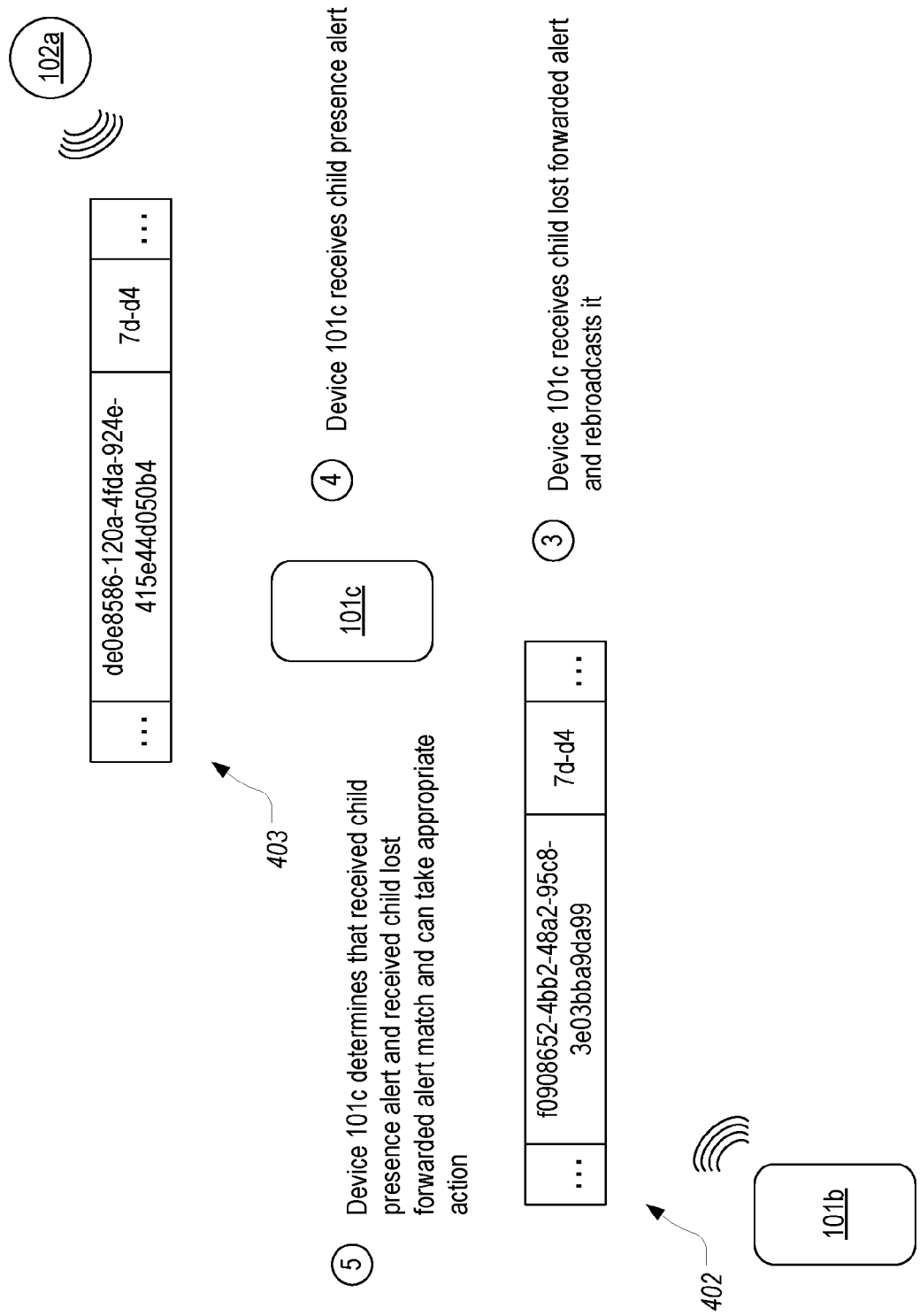

FIGS. 4A and 4B provide an example of how an alert can be propagated when a child is lost. In this example, it will be assumed that a child is carrying a child device 102a and that this child has been separated from his parent who is carrying a user device 101a. It will also be assumed that, upon determining that the child is lost, the parent provides input to user device 101a to initiate the process of broadcasting a child lost alert for the lost child. Therefore, in step 1, device 101a creates a child lost alert 401 by including the child lost alert identifier (a50bb6e . . . ) in the proximity UUID field of an iBeacon packet and an identifier of the lost child (which is assumed to be 7d-d4) in the major and minor fields of the packet. Device 101a then commences broadcasting alert 401 (e.g., as part of a BLE advertising channel PDU) at a suitable interval.

It is assumed that user device 101b is within proximity of user device 101a (and that user device 101b is configured to participate in the system such as by including the appropriate mobile application or OS feature). Therefore, user device 101b will receive alert 401. User device 101b can examine alert 401 to determine that it is a child lost alert based on the presence of the child lost alert identifier in the proximity UUID field. In response, user device 101b can create and broadcast child lost forwarded alert 402 as represented by step 2. As shown, child lost forwarded alert 402 includes the same child identifier (7d-d4) but includes the child lost forwarded alert identifier (f0908652 . . . ) rather than the child lost alert identifier. Any other user device that receives alert 401 would perform this same process to commence broadcasting alert 402.

Turning to FIG. 4B, it is assumed that while user device 101b is broadcasting alert 402, user device 101c comes within proximity of user device 101b and receives alert 402. In response, and as indicated in step 3, user device 101c will determine that alert 402 is a child lost forwarded alert and will commence broadcasting it (not shown). Also, in step 4, which may or may not occur prior to step 3 as will be described below, user device 101c receives child presence alert 403 which is being broadcast by child device 102a. User device 101c can detect, based on the inclusion of the child presence alert identifier (de0e8586 . . . ), that alert 403 is a child presence alert. User device 101c can also identify the child identifier 7d-d4 and use it, in step 5, to determine whether a child lost alert has been issued for the identified child. As indicated above, user device 101c may receive alerts 402 and 403 in any order. Therefore, user device 101c can store an indication of which alerts it has received for a suitable duration of time. In the case that alert 402 is received prior to alert 403, user device 101c will compare the child identifier within alert 403 to the stored child identifier it received in alert 402. In contrast, if alert 403 is received prior to alert 402, user device 101c will compare the child identifier within alert 402 to the stored child identifier it received in alert 403. In this way, user device 101c will be able to determine that it is within proximity of the lost child.

When a child lost alert (or child lost forwarded alert) is received, the receiving device may store the corresponding child identifier indefinitely (e.g., until it is notified that the alert has been cancelled which may occur in any suitable manner including by using a child lost cancellation alert). This may be the case even if the device ceases to receive the child lost (or child lost forwarded) alert from other devices. In contrast, in some embodiments, when a child presence alert is received, the receiving device may store the corresponding child identifier for a suitable amount of time after the device ceases to receive the child presence alert. One reason for this is to ensure that, if a device leaves the proximity of the lost child, it may still detect that it may be in somewhat close proximity to the lost child if a corresponding lost child alert is received.

Upon determining that it has received matching child lost and child presence alerts, user device 101c can take appropriate action. The exact type of action can vary based on a number of factors as will be described below. As an example, the user of user device 101c could be immediately notified that he or she is within proximity of a reported lost child and can be given an option to communicate directly with the parent. Alternatively, user device 101c may automatically communicate with user device 101a. In either case, the type of response may depend on whether user device 101c is currently able to obtain additional information about the lost child (e.g., by using the child's identifier to query a server over the internet for a phone number or other contact information of the parent or to query the server for information that the user device can employ to directly communicate with user device 101a).

FIG. 5 illustrates an alternate scenario in which user device 101c is within proximity of location device 103a when it receives child presence alert 403. Because user device 101c is within proximity of location device 103a, it will receive location alert 404 that includes a location identifier (3a-bf) representing the physical location of location device 103a. As an example, location device 103a may be permanently positioned at a convenience store, a park, a school, etc. Upon receiving location alert 404 and in conjunction with receiving alerts 402 and 403, user device 101c will be able to additionally report a location of the lost child. For example, the location identifier included in location alert 404 could be submitted to a server to retrieve specific details about the location of location device 103*a*. These details could be displayed to the user of user device 101*c* and/or could be reported back to user device 101*a* as part of reporting the presence of the lost child. Of course, if a location device is not in proximity when a lost child is detected and the user device that detects the presence of the lost child is receiving a GPS signal, the current GPS coordinates could be employed to report the location. However, since GPS may not always be available (e.g., when indoors), the use of location devices can enhance the reliability of the system.

Figure 6:
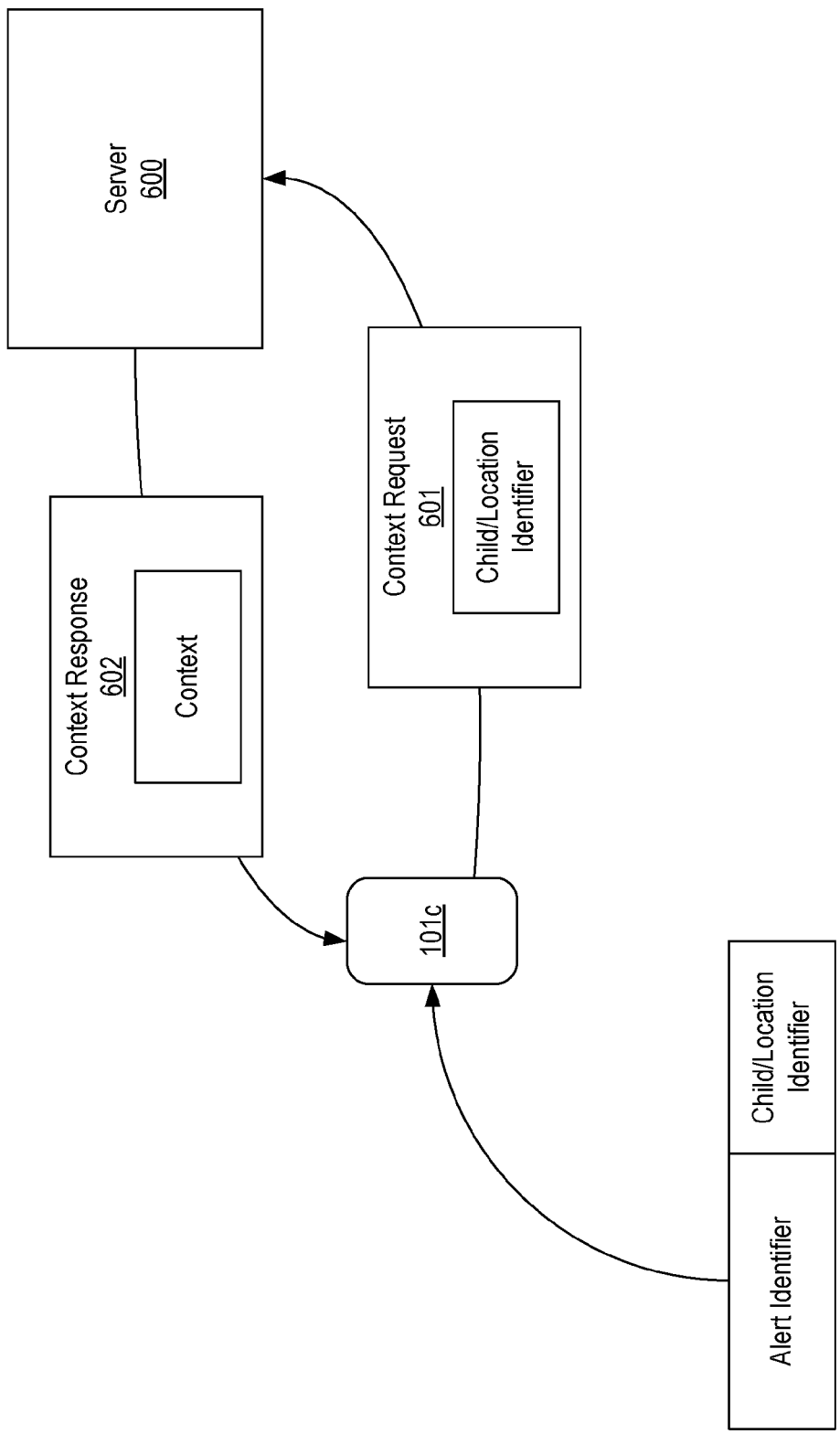
FIG. 6 illustrates how a device can employ an identifier contained in a received alert to obtain context of the alert.

FIG. 6 provides an example of how a user device can employ a child or location identifier contained in a received alert to obtain associated context/information from a server when a network connection is available. As shown, user device 101*c* receives an alert that includes either a child identifier or a location identifier. This alert can be any of the types of alerts previously described as well as any other type of alert that may be suitable for use within the described system. Upon receiving the alert, user device 101*c* can extract the child or location identifier (e.g., from the major and minor fields of an iBeacon packet) and submit a context request 601 that includes this identifier to a server 600. Server 600 can maintain a mapping between identifiers and their corresponding context and can therefore employ the identifier in context request 601 to retrieve the corresponding context. Server 600 can then send a context response 602 that includes this context back to user device 101*c*.

This context can be any type of information about the location or child that may be usable to facilitate locating a child for which a child lost alert has been initiated. For example, for each child identifier, server 600 may maintain context consisting of the child's name, contact information of the child's parent or guardian, a picture of the child, etc. In some cases, this context could be updated after a child is determined to be lost to include the color or type of clothing the child is currently wearing, a last known location of the child, an identification of an individual with whom the child was last seen, etc. Similarly, for each location identifier, server 600 may maintain context consisting of a name of the location, an address of the location, directions to the location, etc.

When a user device receives a context response, the user device can display the context to the user to assist the user in locating a lost child (or other individual, pet, or item). To address privacy concerns, a user device may be configured to request and/or display context for a child identifier only in response to a child lost alert or child lost forwarded alert. In other words, a user device may be configured to not request and/or display context in response to receiving a child presence alert unless or until a corresponding child lost alert has been received. This would prevent a user from viewing context of a nearby child when the child is not lost. Similarly, a user device may be configured to only retrieve context for a location identifier when doing so could help the user report the location of a lost child. In this way, the number of network communications can be kept at a minimum. In short, although a user device could request context in response to receiving any type of alert, it may be configured to only do so when a child lost alert has been received and the user device determines that it is within proximity of the lost child.

Figure 7A:
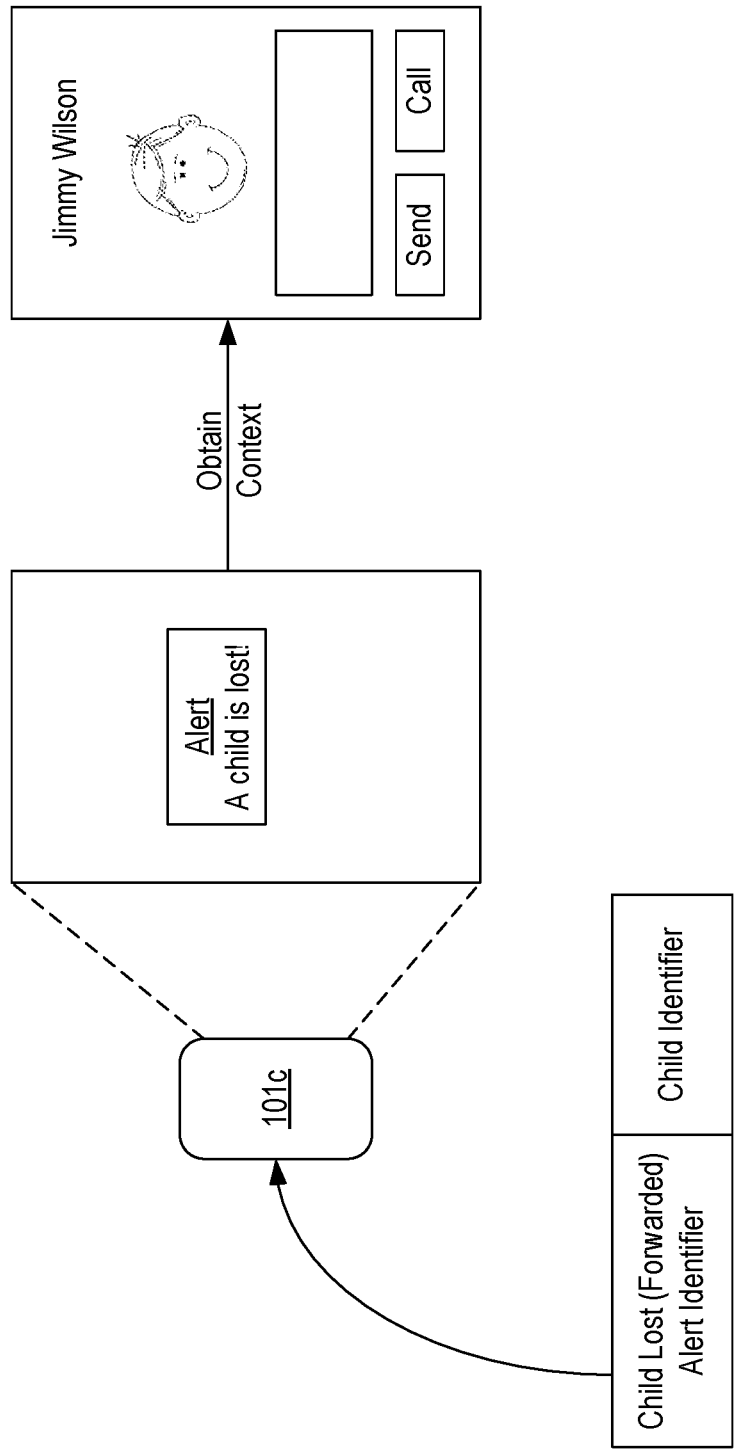
FIGS. 7A-7C illustrate various examples of user interfaces that can be displayed to a user to notify the user of an alert and to allow the user to respond to the alert.
Figure 7B:
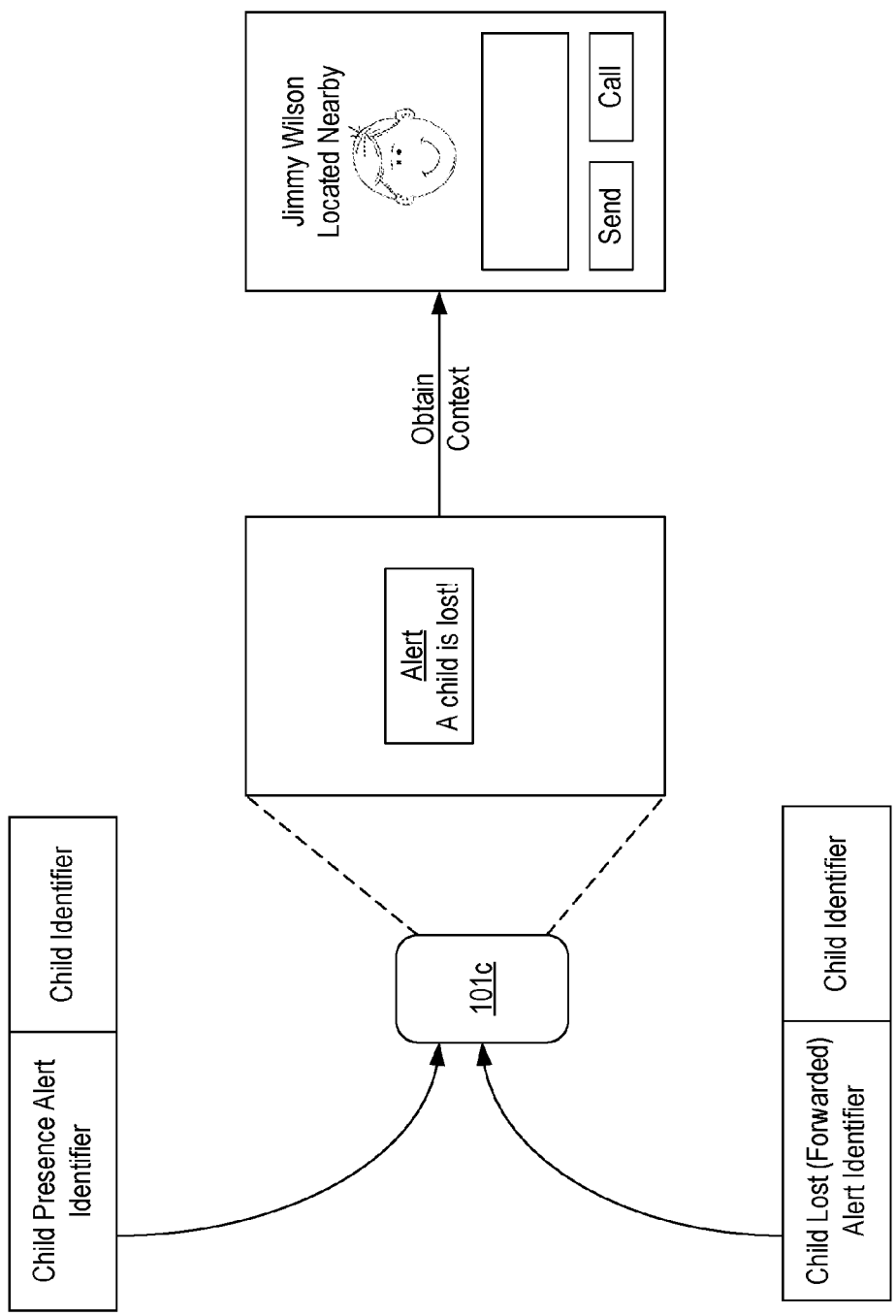
Figure 7C:
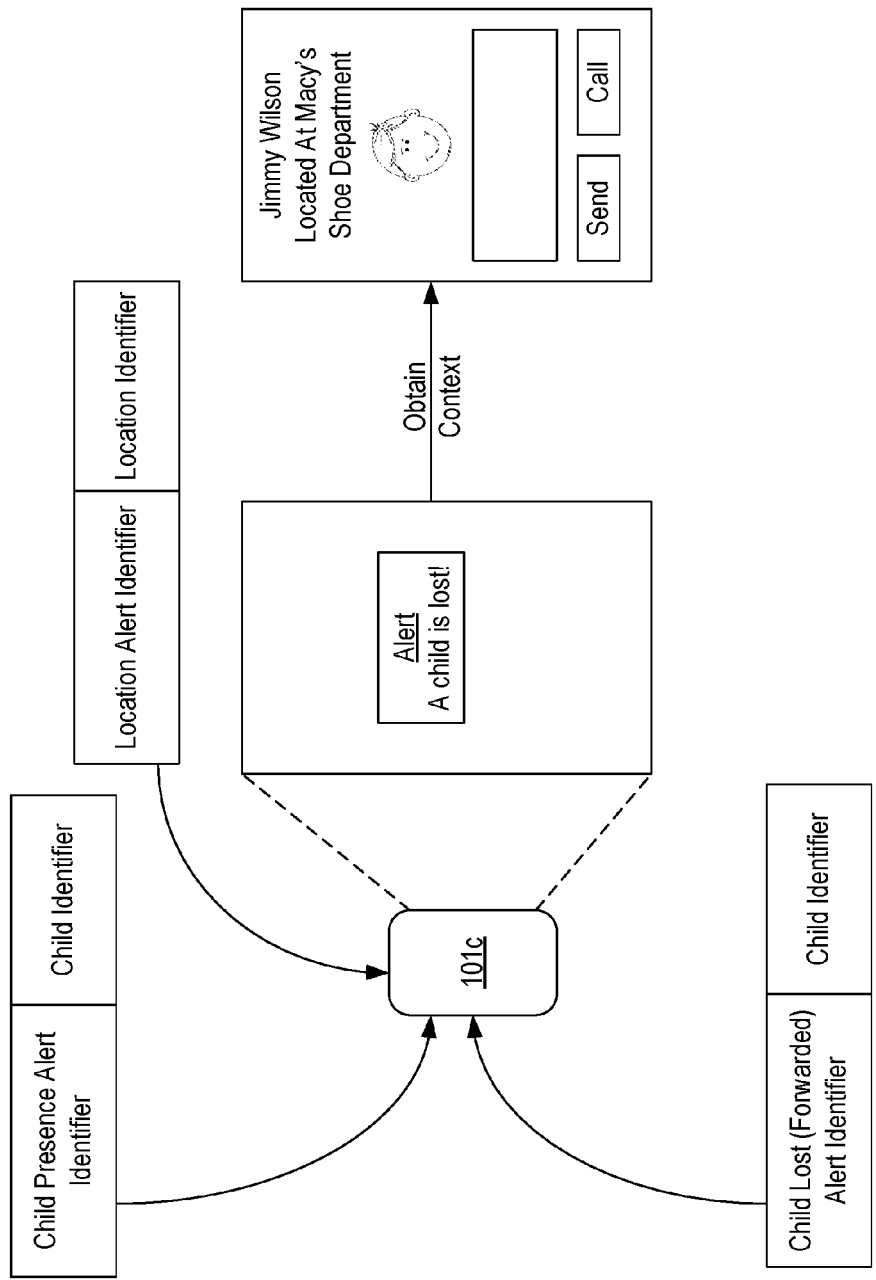

FIGS. 7A through 7C each depict an example of how context of an identifier can be displayed to the user. In FIG. 7A, it is assumed that user device 101*c* has received either a child lost alert or a child lost forwarded alert. In response, user device 101*c* can display an appropriate notification. Additionally, user device 101*c* can extract the child identifier from the alert and use it to obtain the associated context as described above (whether automatically upon receiving the alert or in response to user input selecting the notification). In this example, it will be assumed that the context includes the child's name, Jimmy Wilson, and a picture. This context can then be displayed on user device 101*c* such as in response to the user selecting the notification. As shown, the context can be displayed in conjunction with a text area in which the user can input a message that can be sent to the initiator of the alert (e.g., user device 101*a* in the example in FIGS. 4A and 4B). The display can include a send button which when selected will cause the input message to be transmitted. The display may also include a call button which when selected will initiate a call to the user device that initiated the alert. As mentioned above, in some embodiments, the retrieved context may include the necessary information to allow user device 101*c* to communicate with the initiating user device. For example, the context may include a phone number of the initiating user device or another type of identifier for sending an electronic communication to the initiating device.

FIG. 7A generally represents a case where user device 101*c* receives the child lost or child lost forwarded alert when a corresponding child presence alert has not been received. In such scenarios, the context can be displayed to the user even though the user device has not received a corresponding child presence alert. This is so because the child may not be carrying a child device and therefore the user device may never receive a corresponding child presence alert even when the lost child is nearby. In particular, the context can be displayed so that the user can attempt to visually identify the lost child.

In contrast, in FIG. 7B, it is assumed that user device 101*c* also receives a child presence alert having the same child identifier as the child lost or child lost forwarded alert. As mentioned above, the alerts could be received in any order. In this scenario, user device 101*c* may display the same type of context as previously described, but may also include an indication that the child is located nearby thereby encouraging the user to look for and identify the child in the vicinity. In cases where the child presence alert is received after the child lost alert, the display of the context could be automatically updated (and additional notifications could be output) to reflect that the lost child has come within proximity of the user.

FIG. 7C represents the scenario when the user device also receives a location alert. In this scenario, the user device can employ the location identifier of the location alert to retrieve the location context. The location context could then be included in the display. For example, as shown, the displayed context can include an indication that the lost child is located at Macy's shoe department. In such cases, this location context could be communicated back to the initiating device either automatically or as part of a manually initiated message.

Although not shown, in scenarios where the user device receives a child presence alert and a matching child lost alert (as opposed to a child lost forwarded alert), the user device may display the context in conjunction with an indication that the user is within proximity of both the child and the parent (i.e., the initiator of the child lost alert). This may be the case when the parent and child are not within proximity of one another, while the user is physically located between the child and parent and within proximity of both. This may inform the user that he or she can locate and deliver the child directly to the parent.

The retrieval and display of context can be performed by any user device that receives alerts. In this way, the fact that a child has become lost can be propagated quickly to those that are likely to be within the vicinity of the lost child. In particular, because most people carry a smart phone that can function as a user device, alerts can be quickly spread in a peer-to-peer fashion in the area where the child may most likely be (e.g., in an area surrounding a parent that was last in contact with the child). As these alerts spread from user device to user device, the context of the alert can be displayed to the users to quickly inform them of the situation thereby greatly increasing the likelihood that the child will be found.

Figure 8:
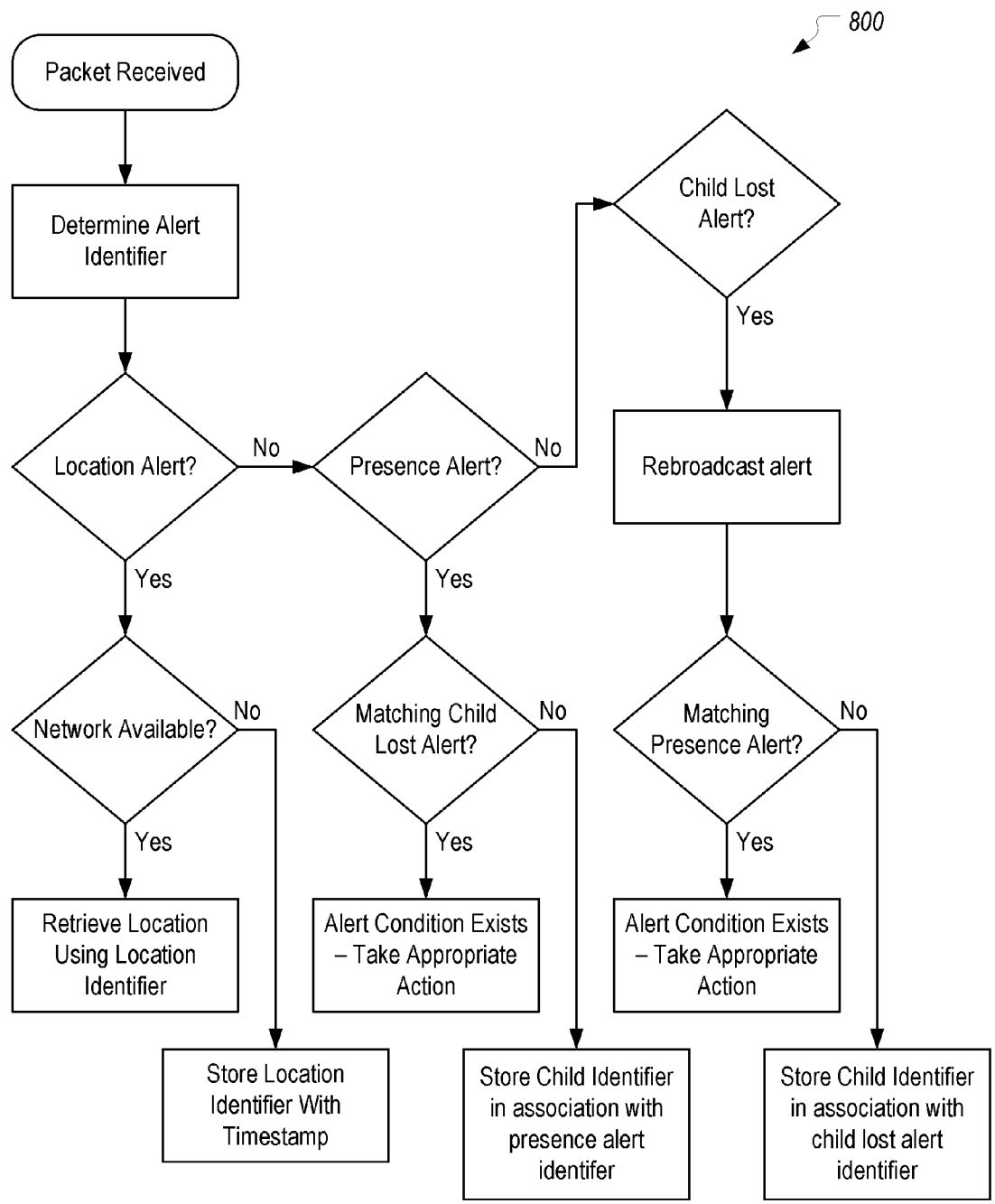
FIG. 8 provides a flowchart of the process that a device can perform when a packet containing an alert is received.

FIG. 8 provides a flowchart of an example process 800 that a user device can perform upon receiving a packet containing an alert. As described above, in some embodiments, the packet may be a BLE packet which encapsulates an iBeacon packet containing an alert identifier in the proximity UUID field and a child or location identifier spanning the major and minor fields. The received packet could have been transmitted from another user device (when the packet is a child lost alert or a child lost forwarded alert), from a child device (when the packet is a child presence alert), or from a location device (when the packet is a location alert).

As a first step, the user device can examine the contents of the packet to identify which alert identifier it includes. For example, in BLE/iBeacon embodiments, the user device can extract the contents of the proximity UUID field of the iBeacon packet. Once the user device has obtained the alert identifier, it can then determine whether it is a location alert (e.g., by comparing the alert identifier from the packet to the known location alert identifier). When the alert identifier is a location alert identifier and a network is available, the user device can use the location identifier from the received packet to query the server for the location context. If a network is not available, the location identifier can be stored with a timestamp. Although not represented in the flowchart, if a network becomes available and the amount of time that the location identifier has been stored does not exceed some threshold, the user device can then use the location identifier to retrieve the location context. In some embodiments, the user device can be configured to delete stored location identifiers after a specified amount of time.

Whenever location context is retrieved, the location context can be stored on the user device in association with the location identifier. In this way, the stored location context will be available for display and/or transmission at an appropriate time (e.g., upon receiving a child presence identifier). The location context can also be stored in association with a timestamp which may identify when the user device last received a location alert containing the corresponding location identifier. In this way, the user device will be able to identify whether stored location context should still be considered relevant.

If the packet is not a location alert, the user device can then determine whether the packet is a child presence alert. If so, it can be determined whether a matching child lost alert or child lost forwarded alert has been received by comparing the child identifier in the child presence alert to child identifier(s) that were previously stored (as will be described below). When a child lost or child forwarded alert matching the child identifier of the child presence alert has been received, the user device can take appropriate action to notify the user that he or she is within proximity of the lost child. As described above, this can include retrieving and displaying context (or only displaying context if it has been previously retrieved from the server). When no matching child lost or child lost forwarded alert has been received, the child identifier in the child presence alert can be stored. In this case, the child identifier can be stored in association with the child presence alert identifier (or some other child presence indicator) so that the user device can know that the child identifier was stored in response to receiving a child presence alert as opposed to a child lost alert. At this time, if a network I available, the user device may also retrieve the context for the child identifier and store it for later use.

Finally, if the packet is not a location alert or a child presence alert, the user device can determine whether the packet is a child lost alert or child lost forwarded alert. Although not addressed in this flowchart, there may be other types of alerts such as a child lost cancellation alert that when received can cause the device to stop broadcasting child lost forwarded alerts and delete the corresponding child identifier that would have been stored.

Assuming the packet is a child lost or child lost forwarded alert, the user device can rebroadcast the alert (if it is not already doing so). The user device can also determine whether a matching child presence alert has been received. This can be accomplished by determining whether the child identifier in the child lost or child lost forwarded alert matches a child identifier that is stored in association with a child presence identifier. When there is a match, appropriate action can be taken including by displaying the appropriate context to the user as described above. In contrast, if there is not a match, information about the child may still be displayed to the user but without the indication that the child is nearby. Also, the child identifier from the alert can be stored in association with the child lost alert or child lost forwarded alert identifier to thereby enable the matching step to be performed when a child presence alert is subsequently received.

Figure 9:
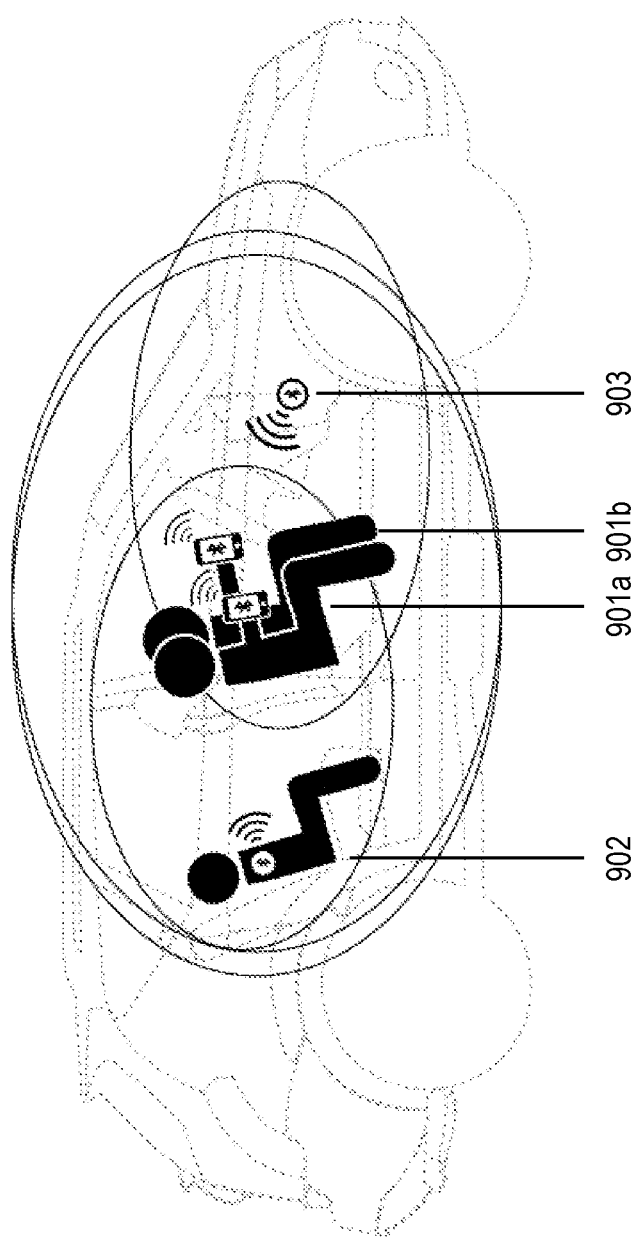
FIG. 9 illustrates how the present invention can be employed in vehicle situations.

In addition to the techniques described above, the present invention may also be employed to implement a tracking technique for use when a child (or other individual, pet, or item) is travelling in a vehicle with one or more parents/guardians. For example, FIG. 9 illustrates a scenario where two parents that are carrying user devices 901a, 901b are travelling in a car with a child (or other individual, pet, or item) that is carrying child device 902. The car also includes a location device 903.

In these tracking embodiments, the formatting and transmitting of alerts can be similar to what is described above except that user devices 901a and 901b can also be configured to transmit presence alerts which would include an identifier (e.g., a parent identifier) that uniquely identifies the parent. Accordingly, each of devices 901a, 901b, 902, and 903 can be configured to transmit presence alerts.

User devices 901a and 901b can include accelerometers capable of detecting movement. When user devices 901a and 901b detect movement in conjunction with the receipt of location alerts from a location device known to be in a vehicle (which could either be pre-programmed into the user device or determined from context retrieved using the location identifier of the location device), they can each trigger a process of collecting a list of any user/child devices within proximity. Therefore, in the example shown in FIG. 9, user device 901a will compile a list identifying user device 901b and child device 902. Similarly, user device 901b will compile a list identifying user device 901a and child device 902. As described above, this can be accomplished by including the identifier contained in any received presence alert.

Both user devices 901a and 901b can continue to monitor whether they are still travelling in the vehicle (e.g., by monitoring accelerometer data to detect that motion indicative of traveling in a vehicle has ceased for at least a threshold amount of time). Once each user device determines that it is no longer travelling in the vehicle, it can transmit the compiled list to a server. The server can store each of these lists. In this way, the server can know that, upon leaving the vehicle, child device 902 was within proximity of user device 901a and within proximity of user device 901b (i.e., that the child was with both parents).

At this point, user devices 901a and 901b may cease broadcasting presence alerts. However, both user devices 901a and 901b will continue to monitor for child presence alerts received from child device 902 to determine whether the child device remains within proximity of the user device. If either of user devices 901a or 901b detects that it is no longer within proximity of child device 902 (e.g., by determining that it has not received a child presence alert for a specified amount of time), the user device can notify the server accordingly. In response to such a notification, the server can update its list for that user device to indicate that the child is no longer with the parent. Additionally, because the updated list includes the identifier of the other parent, the server can use the identifier of the other parent to access that parent's list. If the other parent's list still includes the child's identifier, it can be determined that the child is still with the other parent.

If the parent happens to come back within proximity of the child, a similar process can be performed to add the child's identifier back to the parent's list. This type of updating can be performed any time the child leaves or enters the proximity of the parent. If at any time the server determines that neither parent's list includes the child's identifier, the server can send an alert to both user devices to inform the parents that the child is not with either parent. The server may also allow either of the user devices to inquire whether the child is with the other parent (i.e., whether the other parent's list includes the child's identifier)
.

Of course, if only a single parent were riding in the vehicle, there would only be a single list stored on the server. Therefore, if the child were to leave the presence of the parent, the server would determine that the child is not in the presence of any parent that was riding in the vehicle and can immediately notify the parent. This same process could be employed when more than two parents are involved as well as for each child that may be riding in the vehicle. In short, the server functions to verify that a child's identifier remains included on at least one list at all times.

FIGS. 9A through 9E provide a more detailed example of this process. Although this example involves two parents and a child, the same process could be performed when any number of parents and any number of children are riding in the vehicle together.

Figure 9A:
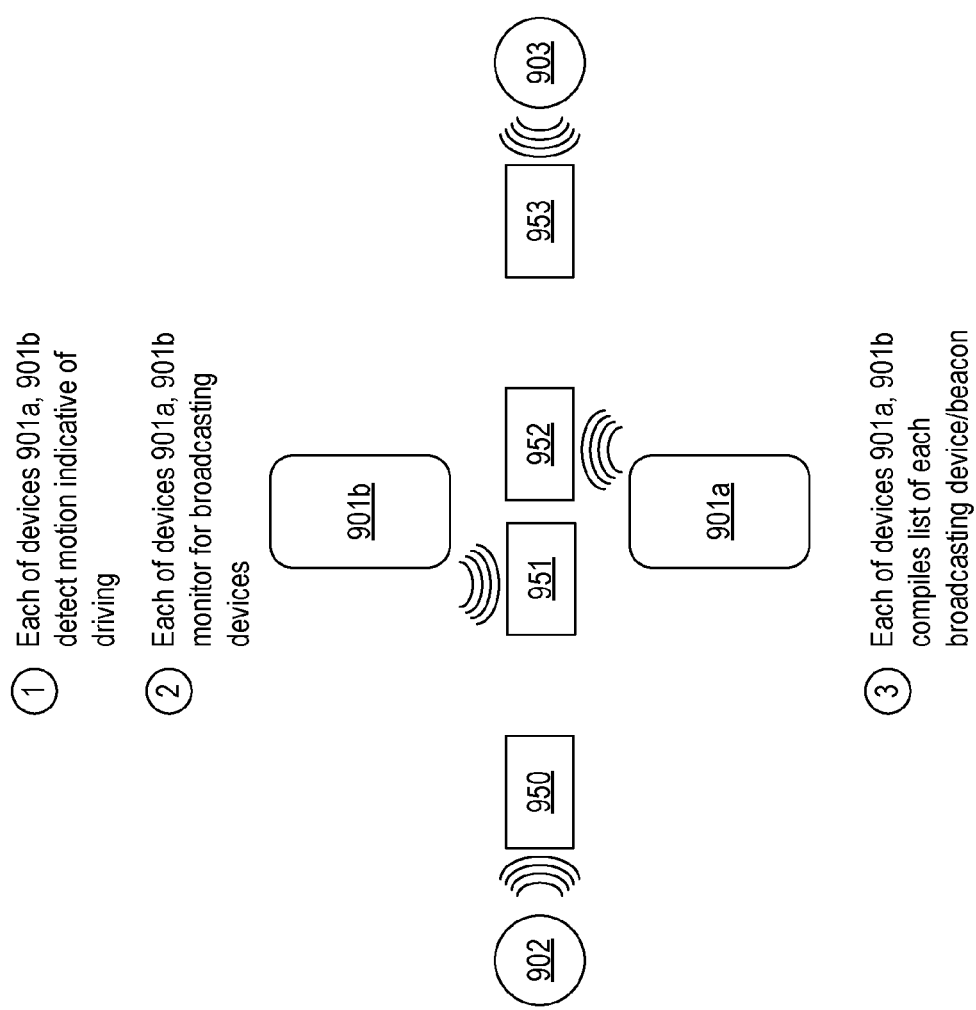

In FIG. 9A, each of devices 902, 901b, 901a, and 903 are shown as transmitting presence alerts 950, 951, 952, and 953 respectively. In this state, and as represented in step 1, each of devices 901a and 901b can monitor accelerometer data (possibly in conjunction with receiving presence alerts from location device 903) to determine whether they are moving in a vehicle. In step 2, upon detecting that they are moving in a vehicle, each of user devices 901a and 901b can commence monitoring for presence alerts and, in step 3, can compile a list of the identifiers contained in received presence alerts. In some embodiments, the user devices may exclude the location identifier of location device 903 from this list.

Figure 9B:
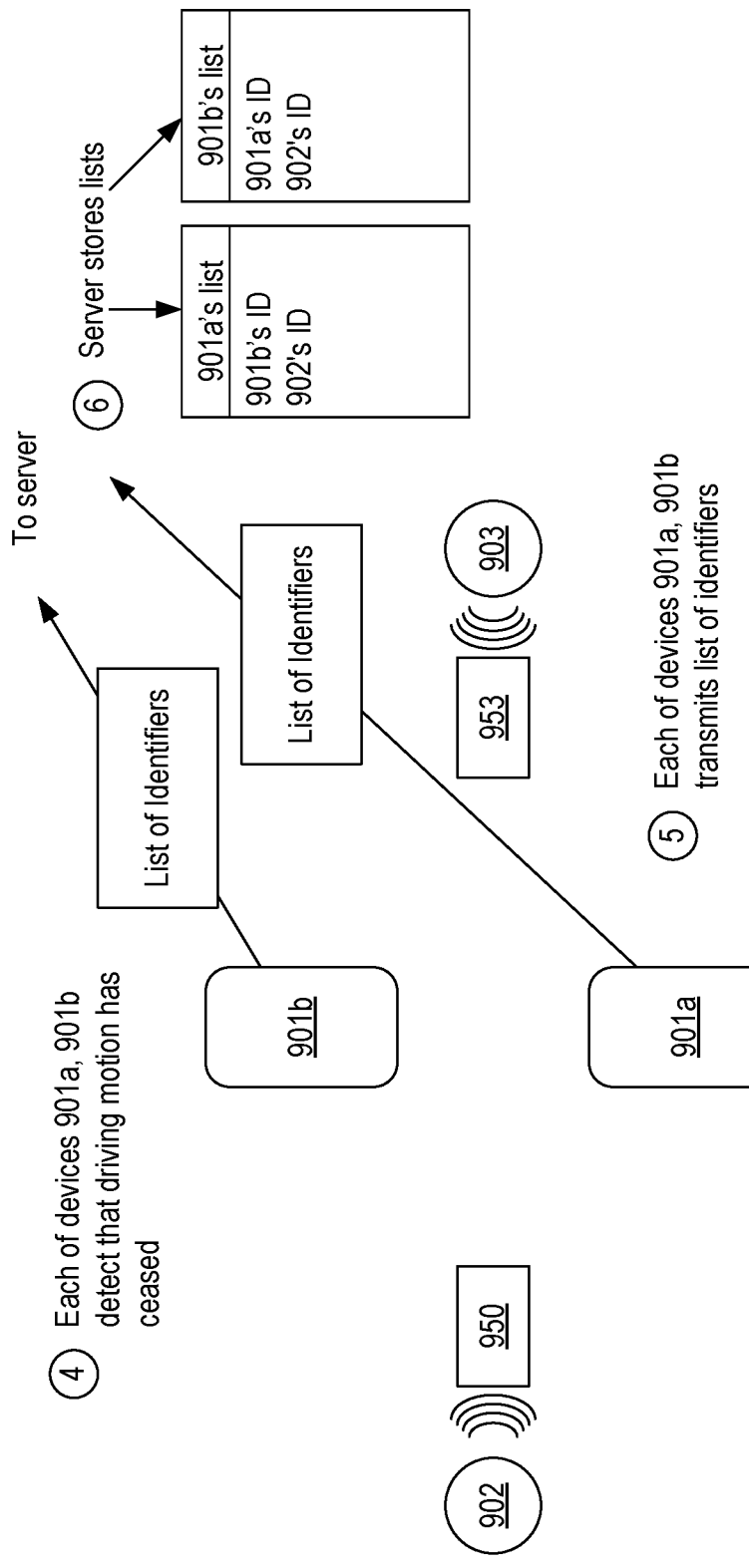

Turning to FIG. 9B, in step 4, each of user devices 901a and 901b can detect that driving motion has ceased. In response, in step 5, each user device can send its compiled list to the server which can store the lists in step 6. Accordingly, as shown, the server can store a list for user device 901a that includes user device 901b's identifier (i.e., the parent identifier associated with the user of user device 901b) and 902's identifier (i.e., the child identifier associated with child device 902). The server can also store a similar list for user device 901b. Then, in step 7, each of user devices 901a and 901b can continue to monitor for child presence alert 950 from child device 902.

Figure 9C:
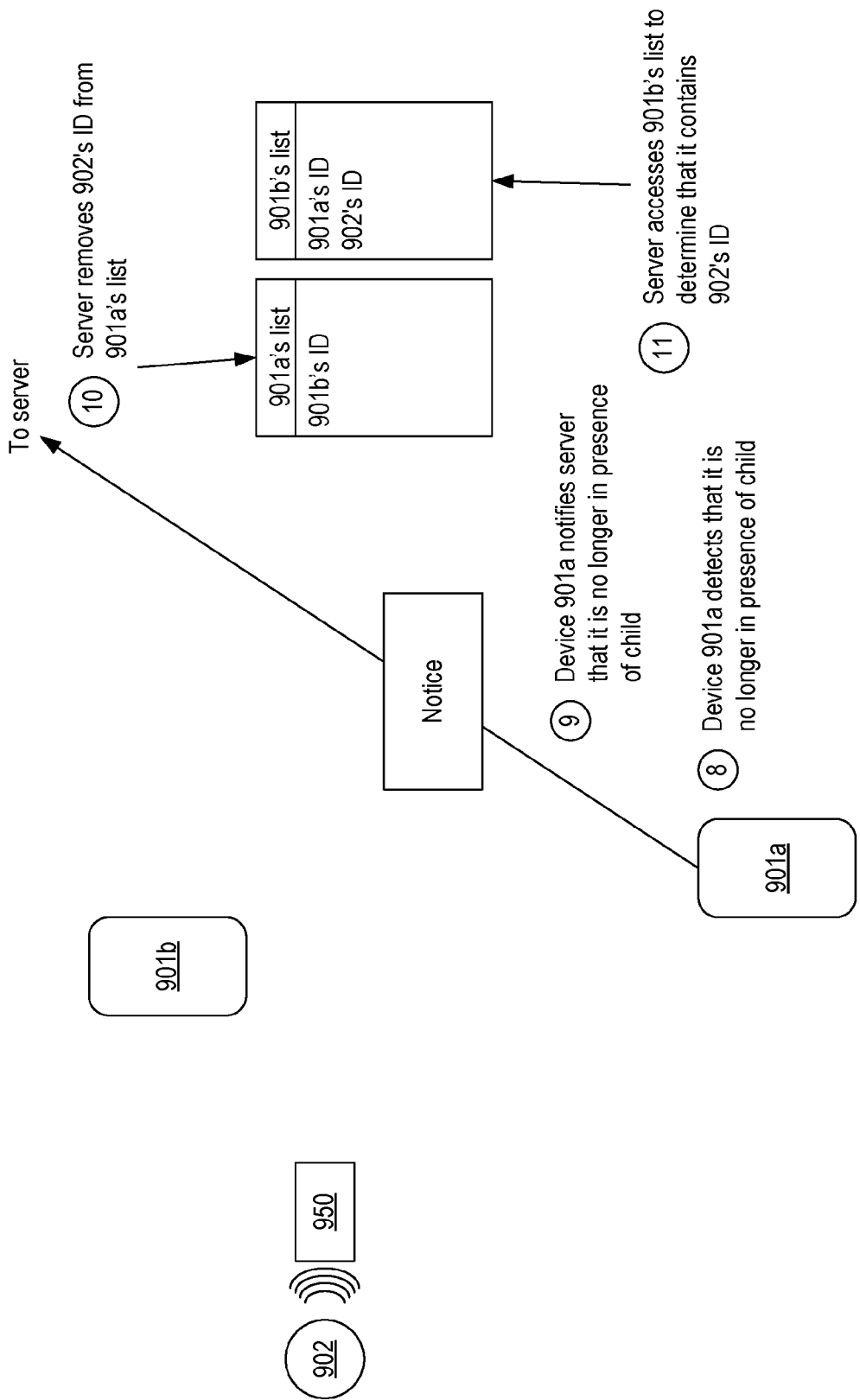

Next, in step 8 shown in FIG. 9C, it will be assumed that user device 901a leaves the proximity of child device 902 and therefore ceases to receive child presence alert 950. In response, in step 9, user device 901a sends a notification to the server indicating that it is no longer in the presence of child device 902. The server can respond to this notification in step 10 by updating user device 901a's list to remove child device 902's identifier. Additionally, in step 11, the server can use user device 902b's identifier contained in user device 901a's list to locate user device 901b's list and determine whether it still includes child device 902's identifier. In this case, because user device 901b has not reported that child device 902 has left its presence, child device 902's identifier will still be present in user device 901b's list. The server will therefore not need to notify either parent. Although not shown, if user device 901a again receives child presence alert 950, it can send a corresponding notification to the server causing the server to add child device 950's identifier back to its list.

Figure 9D:
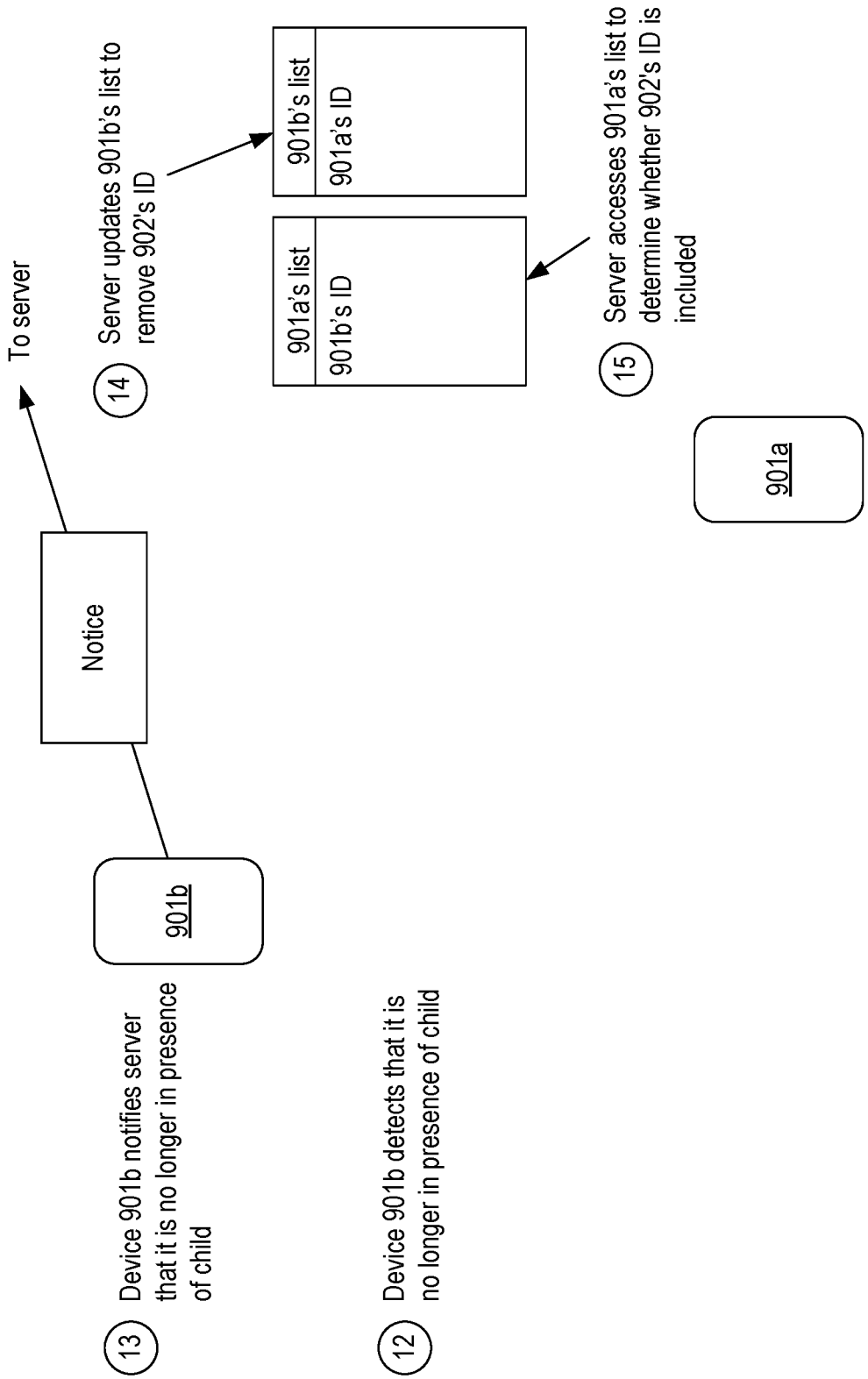

Turning now to FIG. 9D, while user device 901a is outside the proximity of child device 902, user device 901b also moves outside the proximity of child device 902 such that it no longer receives child presence alert 950 in step 12. In response, in step 13, user device 901b will send a notification to the server indicating that it is no longer in proximity to child device 902. The server will then update user device 901b's list to remove child device 902's identifier in step 14. Because the server has removed an identifier from a list, it will then cross-reference any related list which in this case can be performed by employing the identifier of user device 901a contained in user device 901b's list to identify and acesss user device 901a's list. Upon accessing user device 901a's list, the server will determine that child device 902's identifier is also not included in user device 901a's list and will therefore determine that the child is not present with either parent.

As shown in FIG. 9E in step 16, upon determining that neither user device 901a's list or user device 901b's list includes child device 902's identifier, the server can send a notification to both user devices 901a and 901b informing the parents that the child is not with either parent. In this way, the parents will be immediately notified when the child leaves the proximity of both parents and can take quick action to find the child. The tracking system can therefore be employed to ensure that a child (or other individual, pet, or item) is not left unattended in a vehicle or after leaving a vehicle.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a user device, for implementing an alerting system, the method comprising:
    monitoring for alerts that are transmitted using a short range wireless protocol;
    receiving, via the short wireless protocol, a first alert that includes an alert identifier that indicates that an individual is lost and an identifier of the lost individual;
    in response to receiving the first alert, generating and broadcasting, via the short range wireless protocol, a second alert that includes an alert identifier that indicates that an individual is lost and the identifier of the lost individual that was received in the first alert; and
    using the identifier of the lost individual to obtain and display information about the lost individual.

2. The method of claim 1, wherein the alert identifier included in the first alert indicates that the first alert was sent by an initiator user device and the alert identifier included in the second alert indicates that the second alert was not sent by the initiator user device.

3. The method of claim 1, wherein using the identifier of the lost individual to obtain information comprises sending the identifier of the lost individual to a server to obtain the information from the server.

4. The method of claim 1, wherein using the identifier of the lost individual to obtain information comprises identifying that the information was previously retrieved and stored on the user device.

5. The method of claim 1, further comprising:
    storing the identifier of the lost individual in association with the alert identifier that indicates that an individual is lost.

6. The method of claim 5, further comprising:
    receiving, via the short range wireless protocol, a third alert that includes an alert identifier that indicates that an individual is present within a proximity of the user device and an identifier of an individual;
    comparing the identifier of the individual included in the third alert to the stored identifier of the lost individual; and
    upon determining that the identifier of the individual included in the third alert matches the stored identifier of the lost individual, displaying an indication that the user device is within proximity of the lost individual.

7. The method of claim 6, wherein the indication includes an option to contact an initiator user device.

8. The method of claim 6, further comprising:
    receiving, via the short range wireless protocol, a fourth alert that includes an alert identifier that indicates that a location is present within a proximity of the user device and an identifier of the location;
    using the identifier of the location to obtain information about the location; and
    displaying the information about the location in conjunction with the indication that the user device is within proximity of the lost individual.

9. The method of claim 8, wherein using the identifier of the location to obtain information about the location comprises one of:
    sending the identifier of the location to a server to obtain the information about the location; or
    identifying that the information about the location was previously retrieved from the server and stored on the user device.

10. The method of claim 1, wherein the short range wireless protocol is Bluetooth Low Energy such that the alerts are in the form of Bluetooth Low Energy packets, and wherein the alert identifier that indicates that an individual is lost is stored in the proximity UUID field of an iBeacon packet contained within the Bluetooth Low Energy packet.

11. The method of claim 10, wherein the identifier of the lost individual is stored within the major and minor fields of the iBeacon packet.

12. The method of claim 1, further comprising:
    receiving, via the short range wireless protocol, a third alert that includes an alert identifier that indicates that an individual is present within a proximity of the user device and an identifier of an individual;
    comparing the identifier of the individual included in the third alert to the stored identifier of the lost individual; and upon determining that the identifier of the individual included in the third alert does not match the stored identifier of the lost individual, storing the identifier of the individual included in the third alert in association with the alert identifier that indicates that an individual is present within a proximity of the user device.

13. One or more computer storage media storing computer-executable instructions which when executed on a user device implement a method comprising:

monitoring for alerts that are transmitted using a short range wireless protocol;

receiving, via the short range wireless protocol, a child lost alert that includes an identifier of a lost individual; and in response to receiving the child lost alert, generating generating and periodically broadcasting, via the short range wireless protocol, a child lost forwarded alert that includes the identifier of the lost individual.

14. The computer storage media of claim 13, wherein the method further comprises:

receiving, via the short range wireless protocol, a child presence alert that includes an identifier of an individual; and determining whether the identifier of the individual included in the child presence alert matches an identifier of a lost individual that was included in a previously received child lost alert.

15. The computer storage media of claim 14, wherein the child presence alert is received prior to the child lost alert, the method further comprising:

storing the identifier of the individual included in the child presence alert;

upon receiving the child lost alert, determining that the identifier of the lost individual matches the stored identifier of the individual; and notifying a user of the user device that the user is within proximity of the lost individual.

16. The computer storage media of claim 14, wherein the child presence alert is received after the child lost alert, the method further comprising:

notifying a user of the user device that the user is within proximity of the lost individual.

* * * * *